United States Patent [19]

Massucco et al.

[11] Patent Number: 4,755,405
[45] Date of Patent: Jul. 5, 1988

[54] MULTI-WALLED TAMPER-PROOF CONTAINER AND METHOD FOR ENHANCING TAMPER EVIDENCE

[75] Inventors: Arthur A. Massucco, Natick; E. Joseph Stilwell, Boxford; George E. Pickering, Watertown, all of Mass.; Richard E. Merrill, Winnesquam, N.H.

[73] Assignee: McNeilab Inc., Fort Washington, Pa.

[21] Appl. No.: 52,710

[22] Filed: May 20, 1987

[51] Int. Cl.$^4$ .............................................. B65D 55/02
[52] U.S. Cl. ...................................... 428/35; 428/916; 206/459; 206/807; 215/1 C; 215/365
[58] Field of Search .................. 428/35, 416; 206/807, 206/459; 215/365, 1 C

[56] References Cited

U.S. PATENT DOCUMENTS

| | | | |
|---|---|---|---|
| 4,424,911 | 1/1984 | Resnick | 428/916 |
| 4,457,430 | 7/1984 | Darling et al. | 206/807 |
| 4,526,752 | 7/1985 | Perlman et al. | 206/807 |
| 4,645,078 | 2/1987 | Reyner | 206/807 |
| 4,678,083 | 7/1987 | Anderson | 206/807 |
| 4,685,578 | 8/1987 | Dunshee | 206/807 |

Primary Examiner—John E. Kittle
Assistant Examiner—James J. Seidleck
Attorney, Agent, or Firm—Robert K. Tendler

[57] ABSTRACT

A tamper-resistant vessel which contains a liquid is provided with a non-adherent multi-walled construction having, in one embodiment, at least two adjacent non-adherent layers for providing a void in between to enable tamper indication by discoloration indicative of gross spoliage. In one embodiment, the container or vessel has an opaque inner wall and a closely spaced transparent outer wall, with a void in between. Puncture from the outside through the two walls provides seepage of the interiorly-carried liquid between the multiple walls to provide the look of spoilage. In a second embodiment, a multi-wall structure is utilized in which all walls are transparent or semi-transparent, and in which a hydrophilic and/or dissolvable intermediate wall is provided between the inner and outer walls, with the intermediate wall containing minute particles of a water-soluble dye, such that when the container is punctured from the outside, liquid from within the container penetrates and works either in a void between the walls or through the intermediate wall to activate the dye particles, thereby to provide the look of spoilage through dye solvation, color development, and consequent bleeding. The interior wall or walls of the container are made of either flexible or frangible material, which material does not come back to its original rest position vis a vis the outer heavier wall upon penetration of the container, which makes it difficult to gauge the distance at which sealing adhesive is to be applied, thereby to thwart efforts to conceal the tampering. Labeling for the subject bottles is preferably transparent so that the spoilage or mottling effect can be easily viewed through the label.

10 Claims, 8 Drawing Sheets

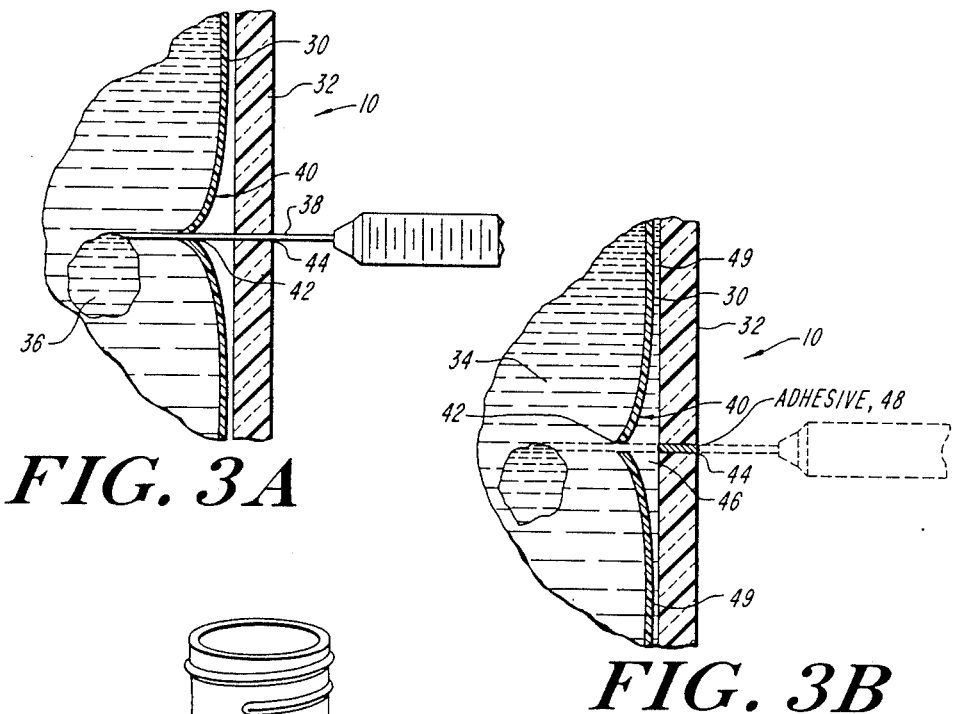
FIG. 3A
FIG. 3B
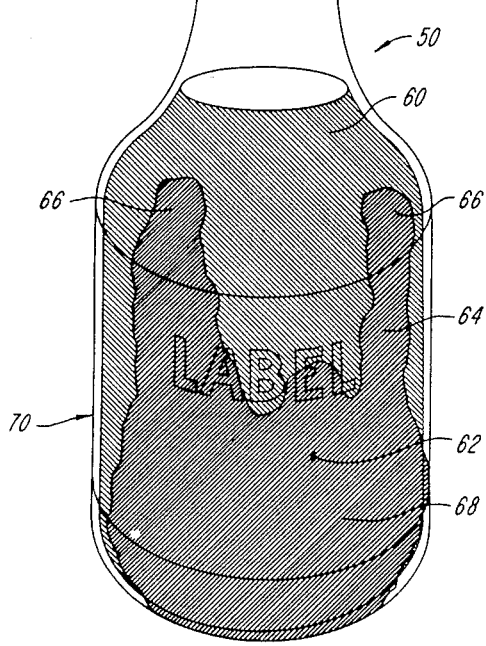
FIG. 4

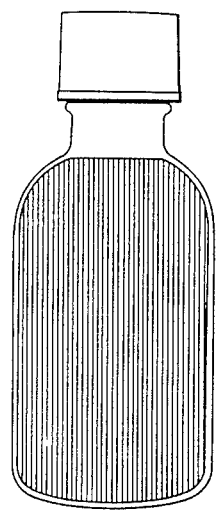 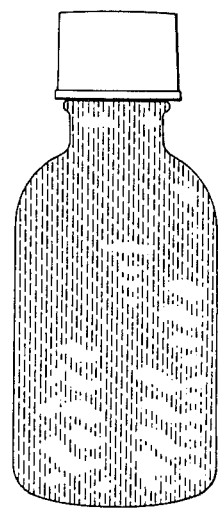
*FIG. 12A*     *FIG. 12B*

MULTI-WALLED TAMPER-PROOF CONTAINER AND METHOD FOR ENHANCING TAMPER EVIDENCE

FIELD OF INVENTION

This invention relates to anti-tampering techniques and more particularly to means for providing an indication of spoilage to indicate tampering.

BACKGROUND

Tampering with vessels or bottles containing pharmaceuticals or other liquids has been of major concern both to manufacturers and consumers. It will be appreciated that drugs in liquid form are most usually consumed by children, and that tampering with a bottle or container containing a drug for pediatric use creates such a problem for the manufacture that any measure which is as effective as posible in alerting the user to potentially poisonous contamination is of paramount importance not only in saving the individual who uses the drug but also in preventing unwanted publicity for the manufacturer.

While, until the present, it has been mainly encapsulated drugs which have provided the focus for tampering efforts, with single-walled bottle construction, it is presently possible to penetrate the bottle with a syringe carrying, for instance, a poison, and then to reseal the bottle with a second syringe filled with a fast-setting adhesive. The result is that the liquid within the bottle is contaminated with the poison, with the ability to detect the violation of the bottle or container being almost impossible.

In the past there have been numerous systems for indicating the penetration or violation of packaged goods, some of which are illustrated in U.S. Pat. Nos. 4,436,203; 4,449,631; 4,295,566; 4,424,911; 4,434,893 and 4,457,430. All of the above-mentioned patents provide some measure of tamper indication. Some of the above-mentioned patents involve pressurized systems in which indicators are actuated via pressure or vacuum changes due to container penetration. Other of these patents describe systems in which tampering results in activation of a dye. In none of the above-mentioned patents is the concept of providing a mottled or spoiled appearance upon tampering either shown or taught. Rather, in some of the above patents, upon tampering either a complete color change of the package occurs, or the tampering results in the appearance of a printed warning.

By way of example, with prior pressure responsive systems, tampering can involve pressure changes which lead to indications that by and large are ignored by the buying public either out of ignorance or out of simple neglect. Also the shelf life of such products is limited due to the pressurization or vacuum involved. This is because plastic containers can typically only hold pressurization for six weeks to six months, whereas certain drugs in liquid form can stay on the pharmacist's shelf for as many as two or three years. Another reason for the lack of viability of such pressure-related indicators is that the buyer must be somewhat sophisticated to know what to look for in terms of either a pop-up cap or a change in the container configuration, which change may not be readily perceptible.

Moreover, the anti-tempering protection provided by pressurized bottles can be circumvented by the use of dry ice to evacuate the bottle slightly during the penetration attempt. Thus the pessurized anti-tampering devices can be easily circumvented.

With respect to dye-indication systems, those tampering indication methods in which a complete color change occurs are not sufficiently graphic to indicate tampering because the buyer is generally unfamiliar with what the container should look like as opposed to what it does look like after tampering. Moreover, for those materials which carry printed warnings in the form of inks which are activated upon tampering, it will be appreciated that such warnings are often ignored because the only evidence of tampering is additional printing. Moreover, most of these systems are activated by humidity in the air which takes a relatively long period of time. Additionally, when laminated layers are used, adhesive normally utilized to bond the multiple layers together restricts the flow of liquid to the dye-carrying layer such that even when water-sensitive dyes are utilized, either the dye is not activated because insufficient amount of water is in contact with the dye-carrying ink or because the aforementioned adhesive bonding prevents capillary action that would permit migration of the water to the dye. Additionally, carriers for imprinted inks prevent the bleeding of the dye away from its originally imprinted position. Thus these systems do not result in an indication of spoilage by dye bleeding. This is because water-activated print indicators are specifically designed not to bleed so that the information to be conveyed to the user will be clear and visible.

By way of further background, it should be noted that tamper-resistant containers have been provided with shrink-wrapped materials which in general may be easily removed and replaced without any visible indication that the particular container has been tampered with.

SUMMARY OF THE INVENTION

In contradistinction to the above methods of indicating tampering, it is a primary object of the subject invention to indicate tampering not by the use of suddenly-appearing printed warnings, not by the use of torn overcoverings or shrink wrappings, nor by the physical change of the container or part thereof upon violation or puncturing of the container, but rather to indicate tampering by indication of gross spoilage. Spoilage, as used herein, refers to the visible appearance on the bottle or container of streaks or patches of color indicating that the particular product is unsafe, not particularly because it has been tampered with, but because it appears to be spoiled. It has been found that spoilage indications give the buyer more of an incentive to either return the product or to throw it out prior to use. The indication of spoilage versus any other indication of tampering is thus preferred because it has been found through consumer testing that all other known indications of tampering oftentimes go unnoticed by the user despite publicity to alert the users to be careful and look for tampering indicators. Often, one reason that tampering indicators arel ess effective is due to the variety of different types of indications of tampering. Thus the buying public must be educated to recognize a number of different indicators so that they can make sure that the container that they are buying has not in any way been violated or tampered with.

In contradistinction to the various other methods of indicating tampering, the indication of spoilage per se is sufficiently universal in that it has been found that those purchasing products which later turn out to have spoilage indications invariably either return the product or do not use it. This solves the problem of providing a universal indicator of tampering without having to mention tampering which is an added benefit to the manufacturer in that not only is the tampered merchandise not used; but more importantly, the merchandise is returned without knowledge of the buying public that a tampering has taken place.

It will be appreciated that bottles or containers carrying liquids can most easily be violated through the utilization of a hypodermic needle in the case of thermoplastic or thermosetting resins, or by drilling in the case of glass or ceramic materials. The primary way in which liquid poisons are introduced is through the utilization of a puncture followed by resealing with a clear adhesive so that the tampering is virtually impossible to detect by either the casual or the concerned consumer.

In order to provide for a universal indication of tampering, spoilage is indicated by the streaking of a bottle with colored material upon tampering. Two methods of providing such indication are provided through the subject non-adherent, incompatible, multi-wall construction of the containers. Incompatible or non-compatible, as used herein, means the polymeric materials comprising the different layers will not bond to each other in the absence of an adhesive or high pressure. While it has been found that it is preferable to provide a clear bottle as opposed to an opaque bottle because consumers prefer to see the contents of the bottle or container, it is possible to provide a dyeless system involving a relatively rigid outer wall for the container and a closely adjacent or touching thin inner wall which is of opaque non-adhering material. If the liquid contained in the bottle is something other than clear, or even if it is clear, when the bottle is violated as by puncturing, the liquid in the bottle comes out in sufficient quantity to be carried between the two walls of the bottle because they do not adhere to each other. The spread of the liquid is through capillarity, through gravity descent, or through wicking action. For colored liquids, the result is dramatic in that the surface of the bottle becomes covered with colored streaks or blotches. It is the type of streaking or blotching which would be associated with leakage of liquid from the container and this therefore provides for the spoilage indication. Moreover, the subject system provides a highly effective method of deterring tampering, because when the unsuspecting individual tampers with one of the subject bottles the appearance of color surprises him to such an extent that he cannot figure out what the mechanism is and he gives up and goes away.

It will be appreciated that the walls of the bottle must be formed in such a fashion that no adhesive is provided between the walls so that the aforementioned wicking or gravity feed may operate. It is thus a feature of the subject invention that, after puncture from the outside, the non-adherent, multi-walled construction provides wicking channels or voids, capillary channels or voids, or gravity-flow channels or voids, unobstructed by adhesive which would prevent the interior liquid from providing the aforementioned spoilage effect.

It will also be appreciated that for maximum visibility, labeling on such bottles should be transparent, although opaque labeling is a possibility as long as it does not take up more than a small amount of surface area. Moreover, multiple transparent walls exterior to the opaque wall may be used to increase the difficulty to reseal the innermost wall following tampering.

As an alternative to the dyeless embodiment, all walls of the bottle may be transparent, translucent or semi-transparent, with a dye being interstitially held in a film which is extruded between an inner wall and an outer wall of the bottle. In one embodiment, the film is hydrophilic, distortable and preferably dissolved by the liquid in the container. One such matrix or film is polyethylene oxide which is both transparent and dissolves in water. Alternatively a film with interstitial channels can be used, with the film not necessarily water-soluble. In any event adjacent walls are non-adherent to promote the spread of the spoilage indication.

It has been found that particulate water-soluble dyes in the 1 micron–40 micron range are suitable primarily because they are initially imperceptible so as to preserve the transparency of the bottle until tampering occurs. Dye particle size in the 20–40 micron range is preferable for this purpose. The dye particles are preferably crystaline in order to avoid smearing during preparation of the dye-carrying layer. These particulate dyes are dispersed in a polymer matrix such that their content need not be more than 0.2% by weight, which provides for the transparency or translucency that permits visibility of the liquid contents of the bottle by the consumer. Thus, a further aspect of the subject invention involves the very minute amount of particulate dye that is necessary in order to provide for massive bleeding and gross spoilage indication. While it might be thought that massive amounts of dye material ought to be utilized for maximum effectiveness, it has been found that the aforementioned two-tenths of one percent of particulate dye by weight in a matrix forming an interior intermediate layer is all that is necessary to provide the required indication, while at the same time providing a tranasparency or semi-transparency to the dye-carrying layer or layers. Alternatively the inner layer may be opaque.

It is also a finding of the subject invention that with the aforementioned percentage of dye and dye particle size, the spoilage or mottling appearance occurs within an unexpectedly short period of time on the order of minutes even with the smallest puncture having been made and regardless of the fairly wide range of viscosity of materials carried in the bottles.

One reason for the rapid indication of tampering is in part due to the lack of adhesive or adherence between layers, which adhesive or adherent quality would ordinarily restrict the flow of water-laden liquid to the particular water-soluble dye utilized. Also it has been found that with any spacings between the layers, the wicking or capillary action is so swift that indication of major spoilage can occur within minutes of puncture even for syrupy liquids. Moreover, because of swelling of the water-soluble layer, differences in wall spacing occur which enhances the mottling effect.

While a great number of water-soluble and/or alcohol-soluble dyes will provide the required spoilage indication, FDA approved materials such as FCF Green, FD&C Blue #1, and FD&C Green #3 are preferred. It should be noted that almost all water-soluble dyes are also alochol-activated, which makes the water-soluble dyes effective for alcohol-based products. Thus, because most liquid products have at least a certain water or alcohol content, the subject system is applicable to a wide variety of products.

Note also that the subject system depends on a fair amount of liquid being present to activate the dye to produce the spoilage look. Such a supply is available from the liquid in the container, but not from the air. It has been found that insufficient liquid is available from humidity-laden air to appreciably activate the dye. In fact, most of the dyes used in the subject invention are not sufficiently hygroscopic that they are activated to a significant degree by the water content in the atmosphere. Thus it is the liquid within the container which is the activating medium as opposed to air-borne water molecules.

It will also be appreciated that, as part of the subject invention, it is important that the container not be easily sealed after tampering. Indeed, as a further object of the subject invention, it is the providing of an inner layer or layers which are either frangible or flexible enough such that they move with penetration, and do not return to their original position after penetration which creates additional void area, that prevents easy resealing. If the wall is frangible then there is virtually no possibility of resealing through the utilization of an injected adhesive. If, on the other hand, the wall is relatively flexible with sufficiently little memory, the position that the inner wall takes with respect to the outer wall is variable. This means that if one were to try to seal the inner wall, one would not know how far to push in the hypodermic needle in order to reseal the originally formed hole in the inner wall. It has been found that the required flexibility of the inner layers can be purely a function of thickness. Thus, the use of thinner inner layers forms part of the subject invention.

Note that suitable containers may be square, oblong, cylindrical, spherical, round or irregular. Thus, although containers having tight-radiused corners and edges are somewhat easier to reseal and therefore not as effective, it has been found that even with relatively tight-radiused corners and edges, resealing is difficult. However, in order to prevent effective resealing after tampering the broarder the particular radius involved, the more difficult it is to effectuate sealing through the injection of adhesive due to the unpredictability of distance between the interior punctured layer and the exterior punctured layer. As with the dyeless system, increasing numbers of interior layers, increases the difficulty of resealing.

There are numbers of methods of providing a bottle or container with a multi-wall construction in which there is no adhesive or lamination between the layers. Amongst these are sheet co-extrusion combined with thermoforming, co-injection molding, co-injection blow molding, co-extrusion blow molding, sequential injection blow molding, vacuum forming and cold forming/forging. In one method, one vacuum forms a preform from co-extruded inner layers while subsequently injecting around the thermoformed inner preform the outer layer, followed by blow forming the entire structure.

As part of the subject invention, the differential between the shrinkage rates of the materials of the walls are to be kept controlled. For example, the shrinkage rate of an interior layer should be slightly greater than that of the next adjacent outer layer so as to provide a void between the layers for sufficient progression of the interiorly-carried liquid between the interior walls of the bottle or container.

With respect to the way in which the dye is carried in the intermediate layer, in one embodiment it is blended in a dry state with the polymer and then the layer is formed in any conventional manner to provide a layer containing a granular dye. The most convenient method of doing this is through the utilization of thermoplastic materials. Note, all materials are kept dry before and during the bottle formation process prior to going into a melt process. It is therefore recommended that the materials be dried before going into any extrusion or melt processing step.

One of the dyes utilized which is FDA approved is FD&C Blue #1, which is compounded into the appropriate hydrophillic polymer to make a film which is clear but yet turns blue when impregnated with or attacked by water. The preferred colors for the dyes when they do turn are dark blue, dark purple, or dark green so that there is good contrast with respect to that which is within the bottle or container itself. In one embodiment, the dye material is a crystalline powder in the 20 to 40 micron particle size range which is provided in granular form. Harder particles are preferred since they are more difficult to abrade during the compounding process than are other dyes. This maintains the 20 to 40 micron size throughout the compounding operation and results in less smearing which is advantageous. In general, the dye particles are to be solid and non-porous.

Dyes which are suitable for the subject invention are FCF Green, FD&C Blue #2, FD&C Blue #1, Acid Blue 5BH and various grades of methylene blue. The dyes which are most readily usable in the subject invention have three properties. First, they do not smear out considerably during formation. The second main consideration is that the liquid within the bottle attack the particular polymer film so that it can get to the dye particle which then reacts with the liquid coming from within the bottle to indicate spoilage. The third main consideration is that once the dye dissolves it gives sufficient intensity so as to stand out against the background provided by the liquid contained within the transparent or translucent container.

It will be appreciated that some of the dyes utilized are dyes that have been in existence for many years for the dyeing of fabrics. They are most commonly used in liquid form and are in general acid dyes with the exception of methylene blue dye which is a basic dye or cationic dye. All the rest of the dyes which are usable for the subject system are anionic acid dyes, with a requirement of the dye being that it almost act as if it were pigment since it is not desirable to have the dye smear out during the compounding process.

What will be appreciated is that priorly these dyes were utilized in liquid form and not in particulate form, with the liquids being used for the dyeing of fabrics. It is therefore a further object of this invention to utilize a common water-soluble dye, not in liquid form, but rather in particulate form, a form for which it is not normally suited.

The result of using particulate dyes carried in a matrix is that the dyes dissolve or bleed to give intense color much faster than predicted. Also because of their particulate state and low concentration, container transparency can be preserved.

With respect to the aforementioned lack of affinity of the system for atmospheric-borne moisture, it is not so much the affinity of the dye for water but rather the carrier for water. This is especially a problem when using polyethylene oxide as an interior dye carrier sheet or layer. However, it has been found with the use of polyethylene oxide and the use of an extremely highly water-soluble dye dispersed in it that even when it sits out in a room on a rainy day the material does not absorb so much water such that it is discernibly different in appearance and therefore unusable in the subject invention. Of course once the dried dye-carrying layer has been sealed between layers of the fabricated bottle it is essentially in a captive atmosphere in which humidity does not present a problem until the bottle is in some way violated.

It will be appreciated that the choice of the grade of polyethylene oxide is important because of its availability in relatively low molecular weight for a polymer, namely 200,000. This is desirable because the lower the molecular weight of the water-soluble polymer the easier it is to dissolve in water and therefore the easier it is for a water-bearing liquid within the bottle to attack it and to dissolve it. Thus it is a feature of the subject invention that the lowest molecular weight film-forming, water-soluble carrier is that which is desired. It is preferably incompatible in that it does not adhere at least to the inner layer.

Also note that polyethylene oxide is compounded at a relatively low temperature which means that the dye carried interstitially is not treated very deleteriously during the compounding process. This means that it is not as liable to break up into small particles and act as a pigment, thereby imparting some undesired color to the soluble film. Thus, particulate dyes in the 20-40 micron range are desirable at the 0.2% level.

The outer and inner layers may be made of polypropylene which is a very good barrier to moisture so that the subject system can have an extensive shelf life. Other materials for the inner and outer layers include a co-polymer resin KODAR ®; PETG; polyvinyl chloride; polystyrene; nylon or clear ABS plastic; with non-compatible dye-carrying layers including ethylene vinyl alcohol (EVAL ®) or polyhydroxy propyl cellulose (KLUCEL ®) as well as polyethylene oxide. In one embodiment the inner wall is transparent polypropylene or high-density polyethylene of 3 mils thickness and an outer layer of transparent polypropylene or polyethylene of 20 mils is used, with a one mil thick interior layer of polyethylene oxide with 0.2% particulate dye dispersed therein.

The first advantage of the multi-walled bottle, whether dye-containing or dyeless, is that a package is provided with tamper evidence in the form of highly visible spoilage. Secondly, there is tamper-resistance because it is difficult to tamper with the product and reseal it without the tamperer getting rapidly discouraged. Thirdly, there is an advantage of forensic value in the ability to ascertain the path and time of the violation which may not be evident with other types of tamper indicators.

It is also important to note that, within certain limits viscosity of the contained liquid apparently plays little or no part in the speed at which the spoilage indication occurs either in the dyeless configuration or in the dye-layer configuration. The subject spoilage indication has been made to occur with opaque, translucent and clear layers.

BRIEF DESCRIPTION OF THE DRAWINGS

These and other features of the subject invention will be better understood in connection with the Detailed Description taken in conjunction with the Drawings of which:

FIG. 3A is a diagrammatic representation of a portion of the bottle of FIG. 2 indicating a tampering attempt through the utilization of a hypodermic needle in which toxins or other substances are injected into the liquid within the bottle, the diagram also showing the flexure of the inner layer upon container penetration;

FIG. 3B is a diagrammatic representation of the bottle of FIG. 2 after puncture, indicating the wicking of the liquid within the container between the container walls, thereby to provide the indication of spoilage of FIG. 1;

FIG. 4 is a diagrammatic representation of a second embodiment of the subject invention in which the bottle includes multiple transparent or translucent layers in which an incompatible interior or intermediate layer contains water-activated dye particles which produces an indication of spoilage, with the dye providing a darker indication than the liquid contained within the bottle;

DETAILED DESCRIPTION

Figure 2:
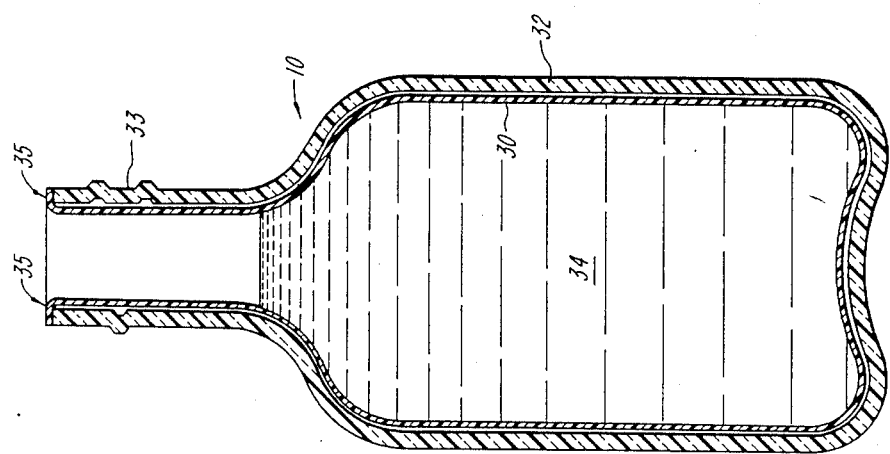
FIG. 2 is a cross-sectional and diagrammatic view of one embodiment of the subject invention in which the multi-walled liquid-containing bottle includes the two closely-spaced inner and outer container walls joined at the top, with the inner container wall being opaque and preferably white and the outer wall being transparent.
Figure 1:
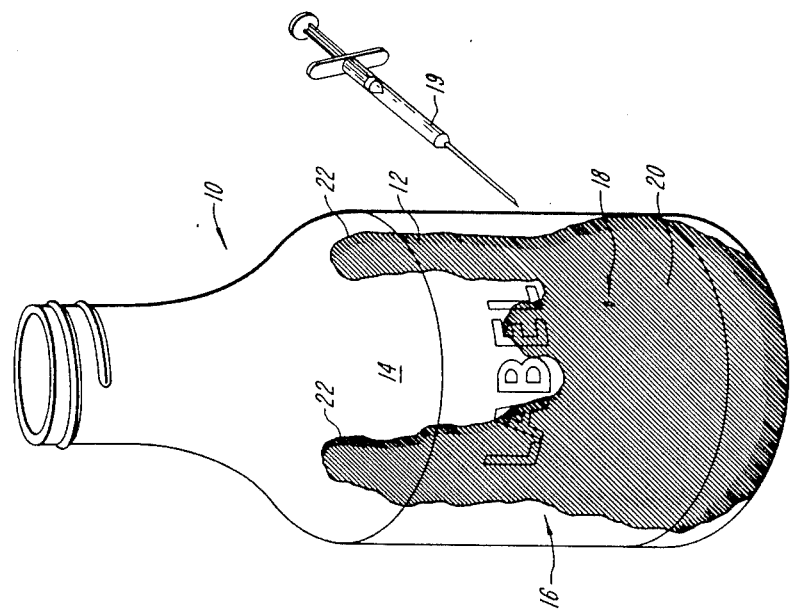
FIG. 1 is a diagrammatic representation of the subject system indicating a bottle puncture and resulting spoilage indication.

In order to provide a vessel with the subject spoilage-type tampering indication, and referring now to FIG. 1, in one embodiment, the system may include a multi-walled structure in which no dye-carrying layer or layers are involved. To this end, a vessel generally indicated by reference character 10 is provided with indication of spoilage 12 which is visible at the surface 14 of the bottle or container, both above a transparent label generally indicated by reference character 16, and through the label itself. As shown in FIG. 2, the interior layer 30 of the bottle is opaque and in a preferred embodiment is white, such that upon injection of a contaminant through an aperture 18 in the bottle of FIG. 1 via a syringe 19, the liquid within the bottle or container wicks out through the two layers which are spaced apart by a finite distance to provide capillary or gravity filling of the interstitial space between the walls. Alternatively, the non-adhering walls may be touching, with the initial void produced by the puncture separating the non-adhering walls to initiate capillary or seepage action.

The inner wall may be thinner than the outer wall for flexibility, or the inner and outer walls may be equal in thickness as long as there is a void between the two after puncture to permit evidence of spoilage. Likewise, the inner wall may be thicker than the outer wall and still provide evidence of spoilage. In any event, the possibility of a void between walls produces the spoilage indication 12, with the indication being formed by the presence of the liquid carried by the bottle which is of a different color than the opaque inner wall. It will be appreciated that both the outer wall and the aforementioned label are preferably transparent so that the progression of the liquid inside the container between the walls can be seen in terms of a highly irregular mottled appearance with either a blotched indication at 20 or streaks as indicated at 22.

Thus, any attempt at penetration of the bottle with a drill, syringe, needle, knife, or other cutting instrument, results in the outflow of liquid from the interior of the bottle to the interstitial space between the layers.

This is more readily apparent when viewed in connection with FIG. 2, in which the opaque inner layer 20 is shown adjacent a transparent outer layer 32. In this embodiment bottle 10 is filled with a liquid generally indicated at 34, which in the usual embodiment has some color, although this is not a requirement. In one embodiment, the spacing of the non-adherent walls 30 and 32 is at least such as to support capillarity if the container is violated. Alternatively, the walls may be touching, only to separate on puncture to allow the seepage of the internal liquid. In any case, after puncture and the seepage of the internal liquid, the wall spacing is sufficient to cause wicking or seepage of the internal liquid between the non-adherent walls. The bottle may preferably be formed by a co-extrusion blow molding process which results in all layers being sealed at the neck 33 of the bottle as shown by overlapping pressed layers at 35, and being spaced one from the other throughout the remainder of the bottle in one embodiment. The layers are kept separated either by differential shrinkage rates or flexibility of an inner wall.

Referring now to FIG. 3A, the method of introduction of a toxin 36, into the liquid 34 within bottle 10 is shown through the utilization of a hypodermic needle 38 which punctures the relatively thick outer layer 32 and the relatively thin inner layer 30 which, as seen at 40, is sufficiently flexible to move away from wall 32 such that the puncture point 42 of the inner layer is removed from the puncture point 44 of the outer layer. Layer 30, in a preferred embodiment, has a thickness range of 3-10 mils and is preferably made out of polypropylene so as to provide the inner layer with flexibility to deflect but with no stretching. The purpose of this is to make resealing of such a multi-walled anti-tamper bottle virtually impossible.

Referring to FIG. 3B, it can be seen that the interior liquid 34 moves through aperture 42 into the void or space 46 between interior wall 30 and exterior wall 32. As can be seen upon removal of the hypodermic needle and sealing at point 44 with an adhesive 48, the liquid within the bottle moves within void 46 and wicks through the interstitial space 49 between the interior and exterior walls, thereby to provide for the mottled or spoiled effect illustrated in FIG. 1.

What will be appreciated in this embodiment is that no dye material need be utilized in order to provide the mottled or spoiled effect for the bottle. The interior liquid having been wicked or having been gravity-fed to the interstitial space between the closely adjacent layers provides for a startling spoilage effect. It will be appreciated that if multiple interior layers are utilized, they are to be transparent in nature, with the innermost layer being opaque in one embodiment.

While the system thus described produces an effective indication of tampering through a spoilage indication, in general customers desire to see the contents of the bottle, vessel or container, which is prevented through the utilization of the opaque inner wall. Wall walls may, however, be made transparent, semi-transparent or translucent, with a spoilage effect being nonetheless visible due to the wetting of the interstitial space between the layers.

However, since the liquid which provides the interstitial wetting is the same as that which is contained within the vessel, the distinction between the interstitially carried liquid and that within the container is not as great as would be the case with respect to a container having an opaque innermost layer.

Figure 5:
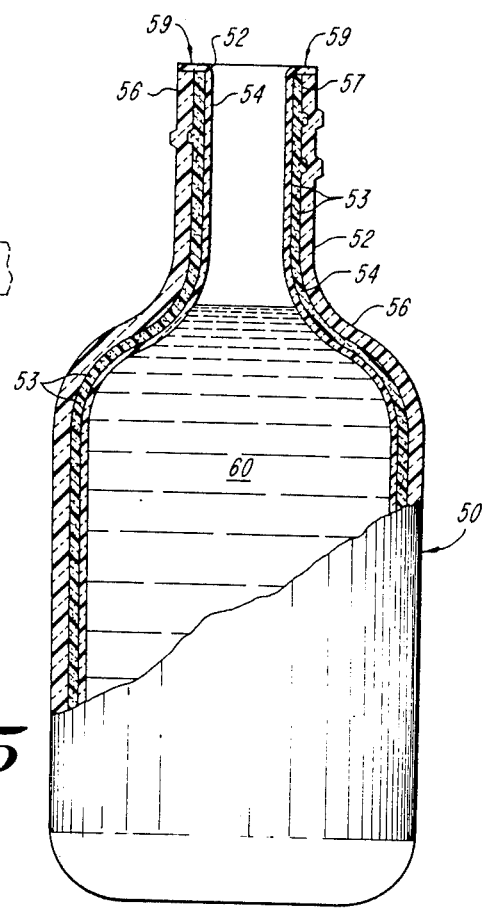
FIG. 5 is a partial cross-sectional diagrammatic view of the bottle of FIG. 4 indicating the multi-layer construction in which all layers are both spaced apart below the bottle neck and are transparent, semi-transparent or translucent, with an interior layer carrying dye particles.

In order to accommodate the desire of the customer to see the liquid contents of a bottle and referring now to FIGS. 4 and 5, a bottle generally indicated by reference character 50 is provided with a transparent inner layer 52, an incompatible intermediate layer 54 carrying particulate dye particles 53, and an exterior layer 56, also transparent which is considerably thicker and less flexible than the interior layers. These layers are at least joined at the top part of the neck 57 of the bottle as illustrated at 59 by the inner layer folded over the tops of the other layers.

As can be seen from FIG. 4, the interior liquid can be seen within the bottle as illustrated by reference character 60 to be of one color, whereas upon violation of the layers, for instance at aperture 62, the dye that is held or carried within the intermediate layer in a matrix is activated to provide a darkened indication 64 of spoilage. The indication of spoilage is provided both by streaks as indicated at 66 and at a blotched or mottled area 68, with the vessel or container being provided with a transparent label 70 over top of the transparent outer layer.

In the dye/carrier embodiment of FIG. 4, the dye particles are not of sufficient density or size as to prohibit the viewing of the interior liquid by the consumer. However, upon puncture at an aperture 62, the liquid within container 50 seeps out through the interior layer or layers to the intermediate layer or matrix carrying the dye particles. This intermediate layer is preferably dissolvable by the liquid within the container, with it being understood that most liquids of interest contain at least some portion of water or alcohol. In this sense, the intermediate dye-containing layer is said to be hydrophilic.

Figure 6:
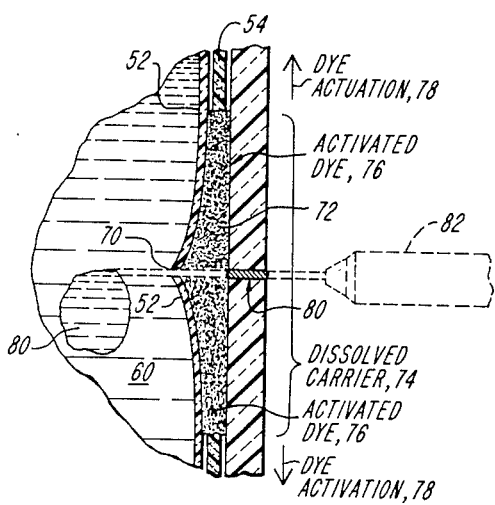
FIG. 6 is a diagrammatic illustration and partial cross-section of the bottle of FIG. 5 after penetration with a hypodermic needle in which the dye particles within the intermediate layer are activated after the intermediate layer or carrier is dissolved, providing a darkened area which progresses from the tamper point.

The action upon puncture of the bottle of FIG. 5 containing a liquid 60 is shown in FIG. 6 in which the innermost layer 52, after having been punctured so as to provide an aperture 70, results in the liquid within the container seeping out through aperture 70 into a void 72 created by the puncture needle into void 53 between inner layer 52 and intermediate layer 54. Upon the seepage of this liquid, the water or alcohol therein causes the intermediate layer 54 to dissolve, such as illustrated by the dissolved carrier portion 74. With the dissolution of the carrier, the dye particles therein are activated to provide a sharply contrasting color as illustrated at 76 which indication migrates as illustrated by arrows 78 away from the point of puncture 80, so as to provide for the mottled or spoiled appearance of the bottle as indicated in FIG. 4. In this case, a toxin 80 is illustrated as having been injected by a hypodermic needle 82 shown in dotted outline. Interior layer 52 is either flexible or frangible such that resealing is difficult as will be described in connection with FIGS. 8 and 9.

Figure 7:
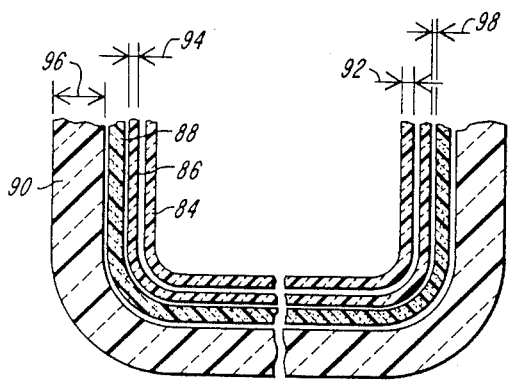
FIG. 7 is a cross-sectional view of a portion of the bottle of FIG. 4 indicating the multi-layer construction in which the outer layer is of a relatively larger thickness than the inner layers, with the inner layers being spaced one from the other below the bottle neck through a process which does not involve adhesive or lamination of the layers, and in which interior layers are provided with particulate dye material, with all of the layers being transparent, semi-transparent or translucent.

However, referring now to FIG. 7, the multi-wall construction of the bottle of FIG. 4 is illustrated in cross-section, in which multiple transparent, semi-transparent or translucent layers 84, 86, 88 and 90 are shown spaced one from the other. Alternatively there walls can be touching but not adhering. As described in connection with the dyeless embodiment, the layers are joined at the neck 57 of the bottle during bottle formation as shown at 59. Interior layer 84 is both transparent in the embodiment illustrated and relatively thin. Also relatively thin are intermediate dye-carrying layers 86 and 88. In the second embodiment, it will be appreciated that one dye-carrying layer is needed. As mentioned hereinbefore, in one embodiment the particulate dye material carried within the intermediate layers 86 and 88 preferably comprises no more than 0.2 percent by weight of the layer, are less than 40 microns in diameter, and may be formed in any one of the aforementioned methods of layer preparation. The thickness of the innermost layer 84 illustrated by double-ended arrows 92 is preferably 3 mils–10 mils; whereas the thickness of the dye-carrying layers as illustrated by double-ended arrows 94 are preferably to be in the range of 0.5 mils–5 mils for materials of ethylene vinyl alcohol copolymer, hydroxy propylcellulose or polyethylene oxide. The thickness of the outer transparent layer is illustrated by double-ended arrows 96 to be in the range of 20 to 30 mils, thereby to provide a self-supporting structure.

Double-ended arrows 98, in one embodiment, specify the interstitial spacing between the non-adherent layers at least after puncture, if not before. This spacing is at least such as to support capillarity when the container is violated. Alternatively, with a disolvable dye-carrying layer, or one which has internal capillary passages, the layers may be touching. The above ranges in wall thicknesses are representative only and may be utilized both in the dyeless embodiment as well as the dye-carrier embodiment.

METHODS OF CONSTRUCTION, MATERIALS AND CONTAINER DESIGN

Non-adherent, multi-layered wall structures of the tamper-resistant and tamper-evident container for liquid products of the subject invention may be fabricated by any one of several methods as mentioned before. These include co-injection molding, co-injection blow molding, co-extrusion blow molding, sequential injection blow molding or vacuum forming or cold forming. The shape of the container, as mentioned before, can be square, oblong, round or irregular, with the container having a narrow or wide neck opening. A wide variety of plastic materials can be used in practicing the subject invention.

Various wall constructions are possible including a thin inner layer of opaque or semi-opaque white polypropylene, a thin middle layer of non-compatible hydrophilic plastic such as an ethylene vinyl alcohol copolymer (EVAL ®) and a thicker outer layer of polypropylene. In a second embodiment the thin inner layer may be a clear polypropylene with a thin middle layer of EVAL ® and a thicker outer layer of modified polyethylene teraphthalate which is a co-polyester resin sold under the trade name KODAR ® by Eastman Plastics Division of Eastman Chemical Products, Incorporated. In a third embodiment, the inner layer may be of opaque polypropylene with an outer layer of polyethylene teraphthalate. In a still further embodiment, the inner layer may be of polypropylene with an outer layer of polystyrene or clear ABS plastic. In a still further embodiment, the inner layer may be of polypropylene, with the outer layer being of polyvinyl chloride, or nylon. In another embodiment, the inner layer may be of translucent polypropylene, with a thin, non-compatible middle layer of EVAL ® and a thicker outer layer of transparent polypropylene. High-density polyethylene may be used to replace the above polypropylene layers. Potential alternative materials to EVAL ® as non-compatible hydrophilic material for the middle layer are polyethylene oxide and KLUCEL ®, which is polyhydorxy propyl cellulose.

As mentioned above, the thickness of the various layers comprising the subject container may vary from a few mils to several mils, with the total wall thickness lying between 15 mils and 40 mils. It will be appreciated that the subject thickness requirements are mainly due to the fact of the liquid contents of the proposed container, undoubtedly comprising water or water/alcohol mixtures. Thus, the container must comply with U.S.P. XX1 requirements for water vapor permeation of polyethylene containers.

With respect to the preferred container design and production method, the preferred container design is a container with a round, narrow mouth in a pour-lip bottle configuration ranging in size from 0.5 ounces to at least a 16-ounce capacity. The container includes an inner layer of transparent polypropylene, high-density polyethylene or polyethylene of approximately 3 mils in thickness, a middle layer of clear EVAL ® or polyethylene oxide of about 1 mil thickness and an outer layer of transparent polypropylene or high-density polyethylene of about 20 mils in thickness. The layers are required to be non-adherent so as to be easily separated to form a void space or capillary upon intrusion by a hypodermic needle as in tampering. The intermediate or middle layer contains minute particles of colored dye that only become apparent when in direct contact with water. A preferred method for producing the above container is by co-extrusion blow molding.

It will be appreciated that the hydrophilic intermediate dye-carrying layer serves two functions. First, it serves as a non-adherent, non-compatible barrier between inner and outer layers of polypropylene or high density polyethylene. Second, because it is hydrophilic and is readily wetted or absorbent, it allows water to contact the impregnated dye particles, thus enhancing the spreading of the contrasting color between the layers from the point of puncture, thus enhancing graphic evidence of tampering.

RESISTANCE TO RESEALING

Figure 8:
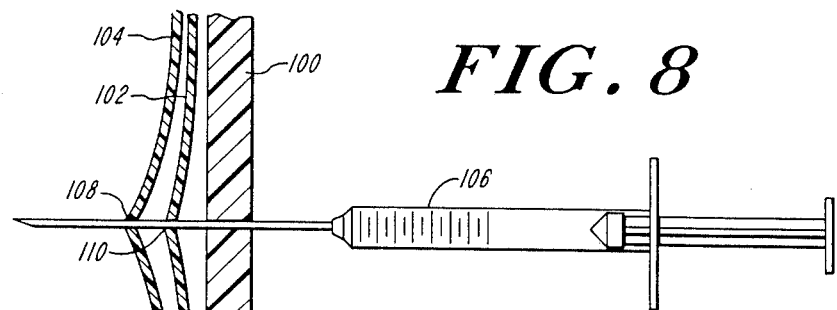
FIG. 8 is a diagrammatic and cross-sectional view of the penetration of a multi-layer bottle in which all of the interior layers, upon penetration, are flexible and move away from the outer layer during a hypodermic puncture or drilling process.
Figure 9:
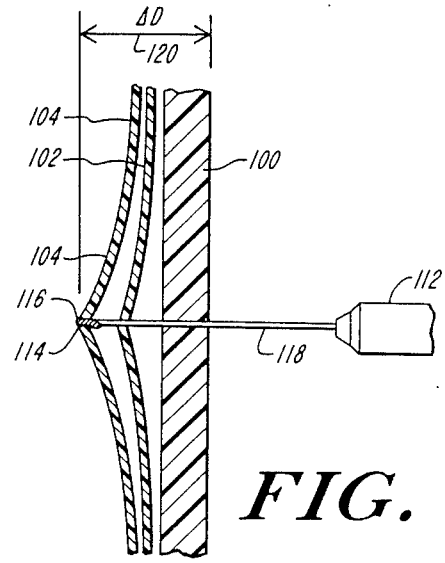
FIG. 9 is a diagrammatic and partial cross-sectional view of the section of the bottle illustrated in FIG. 8 in which for an adhesive to be effective in resealing the tampered bottle, the distance of insertion of the hypodermic needle, would be variable depending on the flexibility and memory of the interior layers of the bottle structure.
Figure 10:
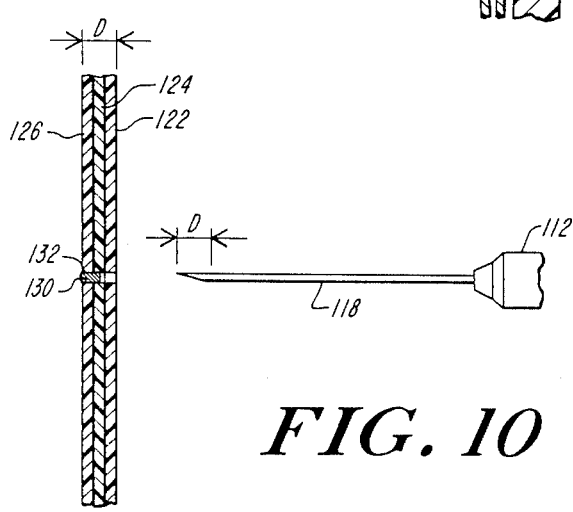
FIG. 10 is a diagrammatic illustration of a portion of an undesirable laminated or adhesively bonded multi-wall container structure, indicating the ease of determining the depth of penetration of a hypodermic needle containing adhesive, thereby to easily seal such a container after tampering.

Referring now to FIG. 8, it will be apparent that a multi-walled structure shown therein includes an outer wall 100, an intermediate wall 102 and an interior wall 104. Upon puncturing of all these walls by a hypodermic needle 106, portions of the thinner walls 104 and 102 move away from the relatively thick exterior wall 100 as seen by wall portions 108 and 110. Were the interior walls to be frangible, it would be impossible to reseal these walls after puncturing. As illustrated in FIG. 9, a hypodermic needle 112 is utilized to deliver adhesive 114 at least to aperture 116 in wall 104, thereby to prevent the contents of the interior of the bottle or container from leaking out in between the walls, which would effectively prevent the spoilage indication. If the interior walls 104 and 102 are flexible and have no memory, the distance that the needle 118 of hypodermic 112 would need to travel from the exterior wall to the interior wall is variable. This is shown by double-ended arrow 120, with the distance D being the variable factor. This is contrasted, as seen in FIG. 10, with a laminated compatible polymer wall system or adhesively-adhered, multi-walled container structure in which walls 122, 124, and 126 have an interior-to-exterior spacing distance D which is fixed. Thus, if the hypodermic 112 were to be used to reseal such a punctured container, the distance that the needle 118 would have to be driven into the container would be exactly the distance D. It would thus be quite easy for the needle to apply adhesive 130 at aperture 132 in interior wall 126.

What will be appreciated is that by the provision of frangible or flexible interior walls, any attempt at resealing using the introduction of adhesive through the initially produced aperture would be extremely difficult to effectively produce due to the variability of the distance of the interior walls from the exterior wall at the point of puncture.

Thus, in a multi-walled, anti-tamper container construction, whether dye-carrying or dyeless, the utilization of frangible or flexible interior walls which are not adhered one to the other or to the exterior wall prevent the would-be tamperer from effectively concealing his tampering activity though the introduction of adhesive into the tampering aperture. The outer wall is made sufficiently thick so the bottle is self-supporting, while the inner walls are made sufficiently thin to move away from the outer wall during puncture.

Figures 11A, 11B:
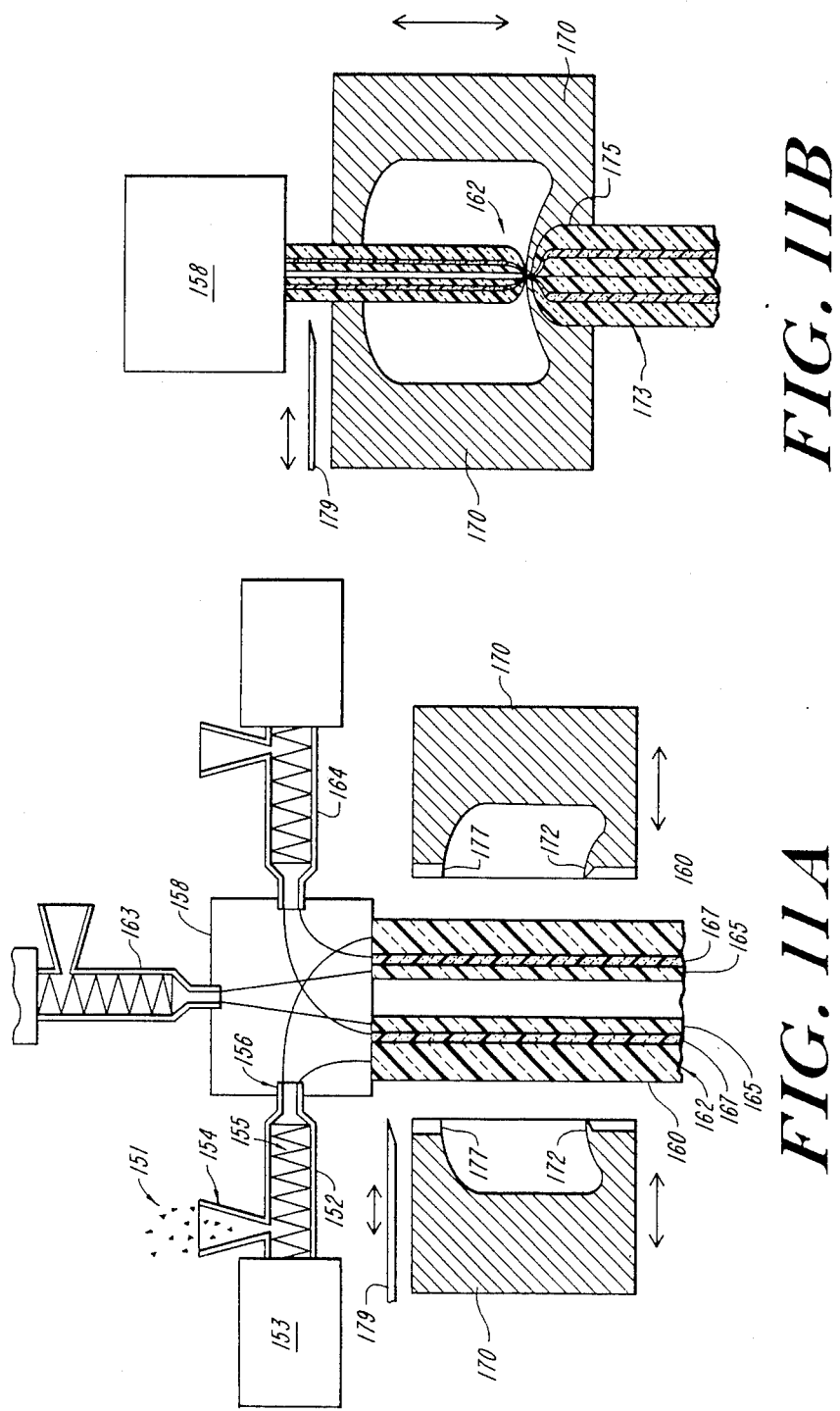
FIGS. 11A, 11B, 11C, and 11D show one method of manufacturing the subject bottle; and, FIGS. 12A and 12B are "before" and "after" photographs of a bottle of the FIG. 4 embodiment showing dramatic spoilage after penetration of the bottle.
Figure 11C:
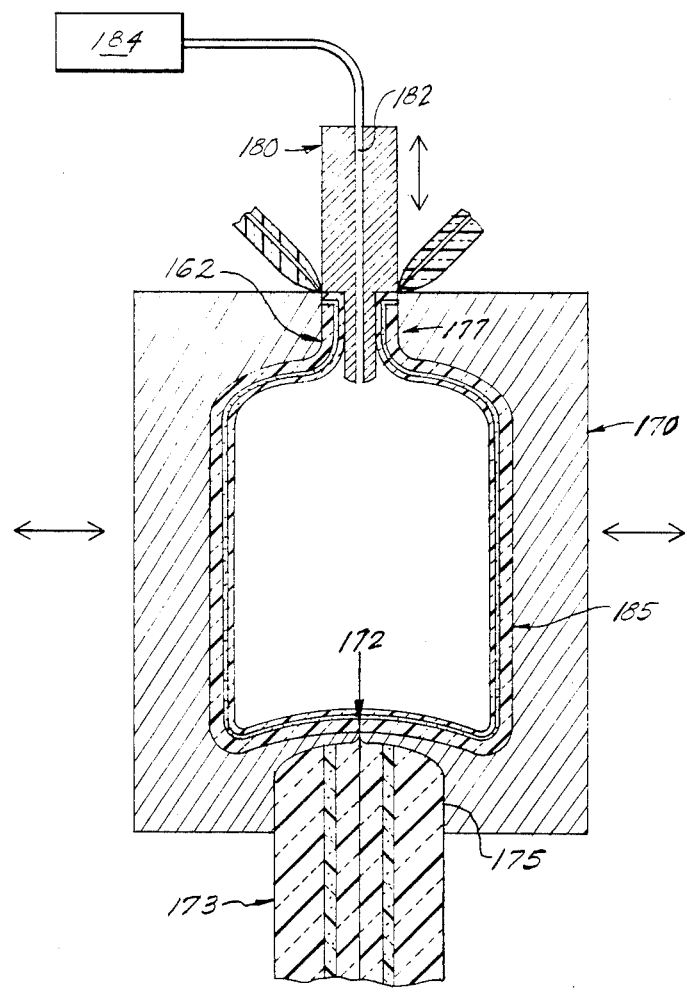

With respect to bottle formation and referring now to FIGS. 11A–C, a process for producing a preferred embodiment of this invention is continuous extrusion blow molding with shuttle molds and neck calibration tooling. This process is preferred for its ability to produce the thin intermediate and inner layers of the preferred embodiment and still form a calibrated sealing surface from the inner layer at the top of the container neck.

FIG. 11A is a diagram of the shuttle blow molding process for producing the three layered embodiment of this invention. Natural color unpigmented polypropylene compound 151 having a known low melt shrinkage rate is introduced into extruder 152 through hopper 154. The polypropylene is heated to the meltin point by energy from the turning action of motor 153 transmitted through the turning action of the extruder screw 155 aided by heater bands, not shown. Molten low shrinkage polypropylene 156 is pushed by turning action of the screw from the end of the extruder into coextrusion die head 158 wherein it passes through a tubular channel in the head to exit the die head as the outer layer 160 of extruded parison tube 162 shown in enlarged scale to illustrate the wall thickness variations of the preferred embodiment. Natural polypropylene preferably having a predetermined higher melt shrinkage rate is similarly introduced into a second extruder 163 and passes through die head 158 to become the inner layer 165 of extruded tube 162. Natural color unpigmented polyethylene oxide compound with 20 to 40 micron FDA approved dye particles is similarly introduced into a third extruder 164 and passes through die head 158 to become the middle or intermediate layer 167 of parison tube 162. During the extrusion of parison tube 162, opposite halves of a container mold 170 shuttle in an open position from a "lower-neck calibration and ejection" position to a higher "clamping" position with the parison tube positioned between the open die halves.

Figure 11D:
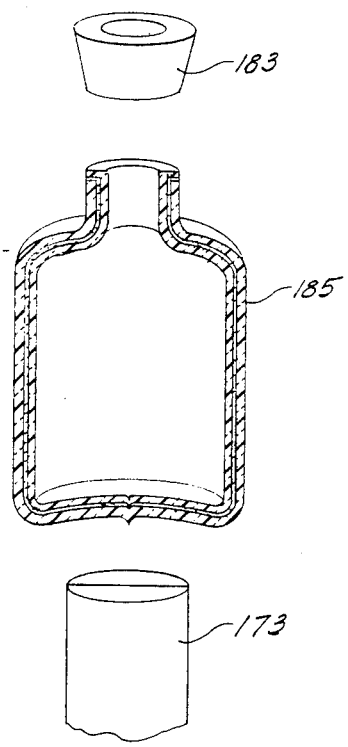

When the extruding parison reaches a predetermined length, the mold halves are closed under pressure entrapping the parison. At this time, sealing of each layer of polymer discreetly to itself at the bottom of the bottle occurs, and the excess portion of the parison 173 which extends below the bottom of the container is cut off, both being accomplished by the pressure of the mold clamp-up acting through properly shaped opposing "pinch off" tooling 172 inserted into the bottom of each mold half. The cut off excess portion of the parison bottom 173 is held substantially within the mold under pressure in cooling void 175 in the bottom of each mold half as illustrated in FIG. 11B and FIG. 11C with layer thicknesses shown in cross section in enlarged scale to illustrate the relative layer thickness variations of the preferred embodiment. Also at this time, in the closed mold position, the top of the parison tube is entrapped but not collapsed within the cavity of the neck portion of mold 170 holding the parison tube 162, as yet unblown, suspended within mold 170 as illustrated in FIG. 11B. The parison tube is cut with a moving knife between the top of mold 170 and the bottom of die head 158. The blow molding 170 with suspended parison tube 162 is then shuttled downward to the "neck calibration and ejection" position. As illustrated in FIG. 11C, in this position a neck calibration plunger 180 is moved over neck portion 177 and forced downward through the open end of parison 162 and into contact with neck portion 177, molding the detail of the neck finish of the container and cutting off the top excess portion of the parison. Air under pressure from an external source 184 is introduced into the center of parison 162 through air passage 182 built into plunger 180 causing the softened parison to expand and contact the cooled surfaces of mold 170 creating finished container 185 within the mold cavity. As shown in FIG. 11D, after cooling, mold 170 opens and ejects the finished container 185, the top excess portion 183 of the parison and the bottom excess portion of parison 173 onto a conveyor for separation and further processing, such as labeling, filling, packing etc of the container.

Referring now to FIG. 12A, a photograph of a multi-walled bottle having a dye-carrying layer and being filled with a liquid is shown prior to wall penetration, whereas FIG. 12B shows the same bottle after wall penetration, indicating drammatic spoilage.

Having above indicated a preferred embodiment of the present invention, it will occur to those skilled in the art that modifications and alternatives can be practiced within the spirit of the invention. It is accordingly intended to define the scope of the invention only as indicated in the following claims:

What is claimed is:

1. Apparatus for providing tampering indication for vessels carrying a liquid by an indication of spoilage upon vessel penetration, comprising:
   a vessel having an inner wall, an intermediate dye-carrying wall and an outer wall; all walls being transparent, semi-transparent, or translucent, said dye turning a color different from the color of the liquid in the vessel upon activation by said liquid, said intermediate wall including said dye in particulate form.

2. The apparatus of claim 1 wherein the size and distribution of said particulate dye in said intermediate wall is such as to leave said intermediate wall relatively transparent, semi-transparent or translucent until dye activation by said liquid upon vessel wall penetration.

3. The apparatus of claim 2 wherein said dye particles are of a 20–40 micron size.

4. The apparatus of claim 2 wherein said dye concentration in said intermediate wall is less than 0.2% by weight vis a vis the wall material.

5. The apparatus of claim 1 wherein said intermediate wall dissolves in said liquid.

6. The apparatus of claim 1 wherein said intermediate wall is hydrophilic.

7. The apparatus of claim 1 wherein said intermediate wall is of a material which permits bleeding of said dye upon dye particle activation with said liquid.

8. The apparatus of claim 1 wherein said intermediate wall is incompatible with said inner wall.

9. The apparatus of claim 1 wherein said intermediate wall is non-adherent to said inner wall.

10. The apparatus of claim 1 wherein said particulate dye is in crystalline form.

* * * * *